Aug. 5, 1958  C. J. DANIELS ET AL  2,846,166
POP-UP MEANS FOR AN AIRCRAFT ARRESTING CABLE
Filed April 25, 1956  3 Sheets-Sheet 2
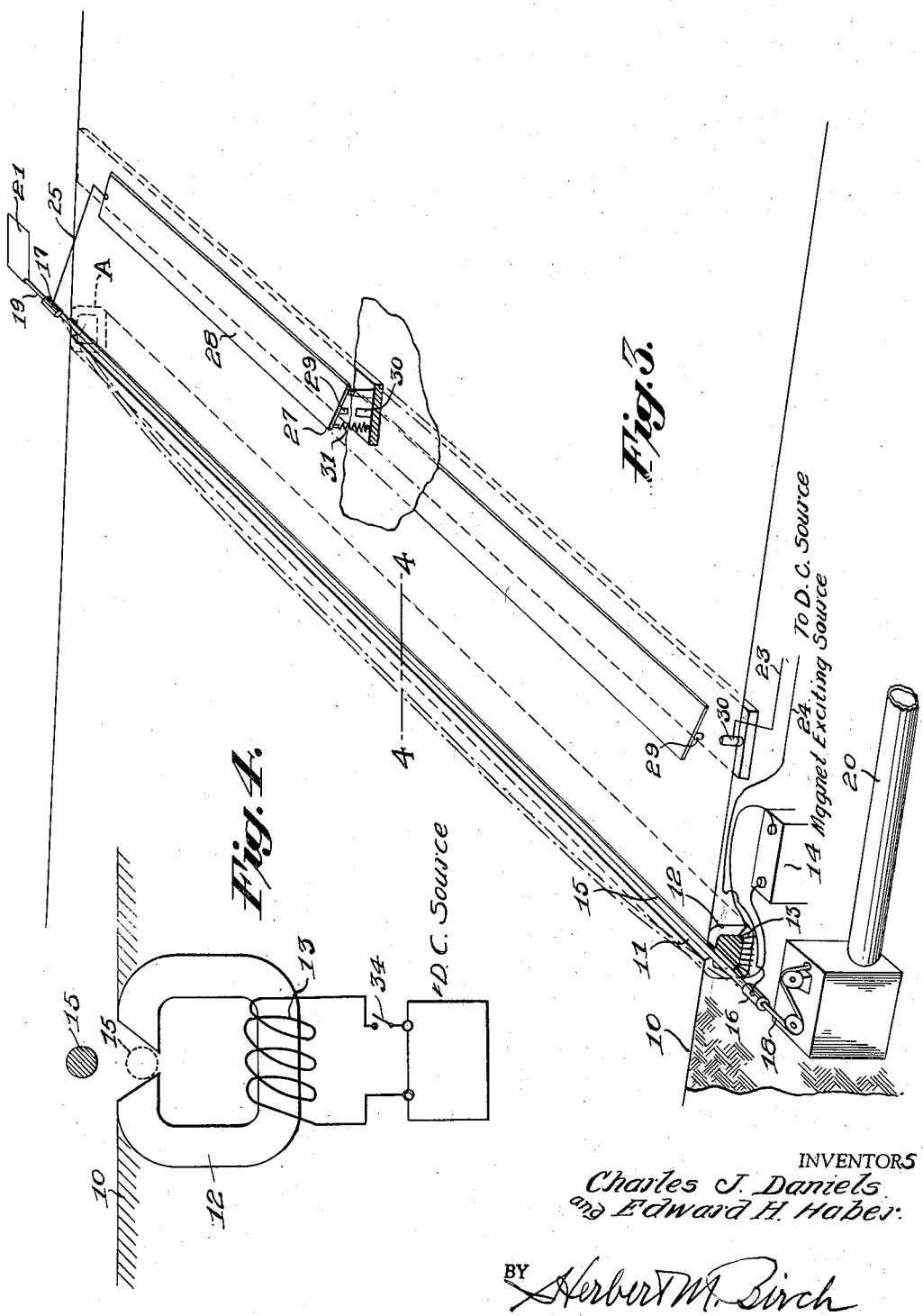
INVENTORS
Charles J. Daniels
and Edward H. Haber
BY 
ATTORNEY Aug. 5, 1958     C. J. DANIELS ET AL     2,846,166
POP-UP MEANS FOR AN AIRCRAFT ARRESTING CABLE
Filed April 25, 1956     3 Sheets-Sheet 3
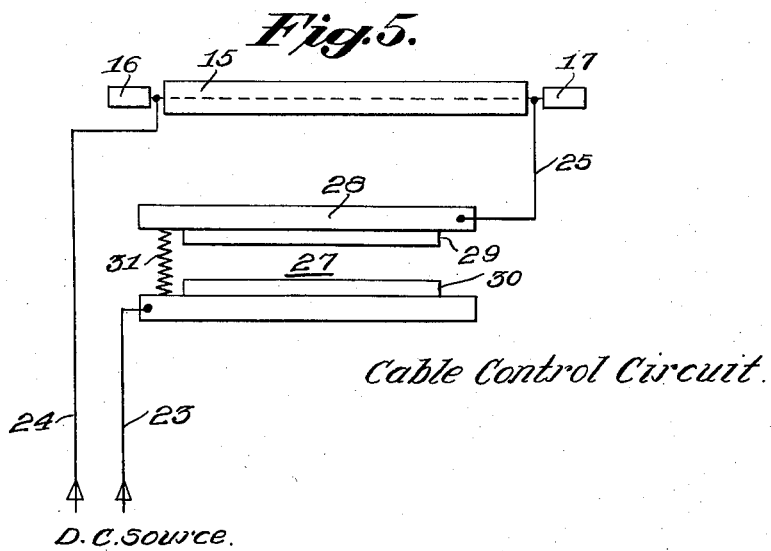
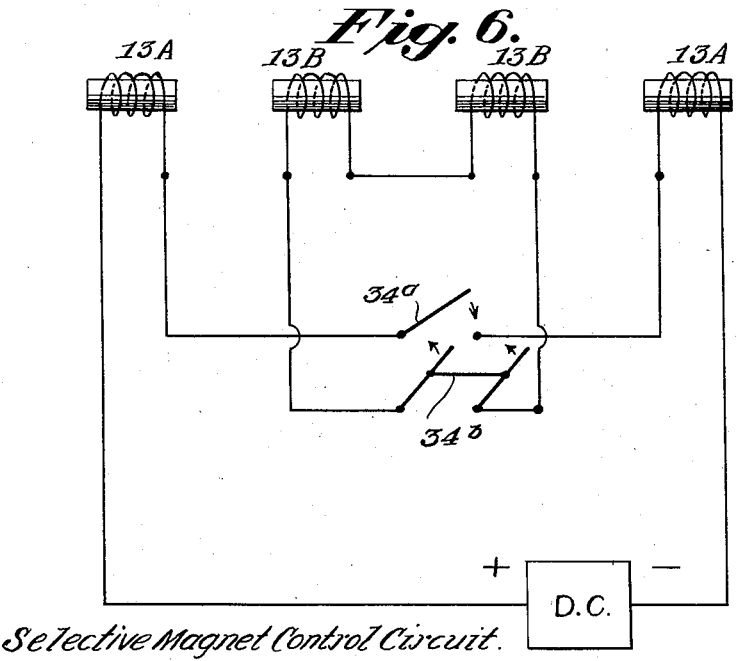
INVENTORS
Charles J. Daniels
and Edward H. Haber
BY Herbert M. Birch
ATTORNEY

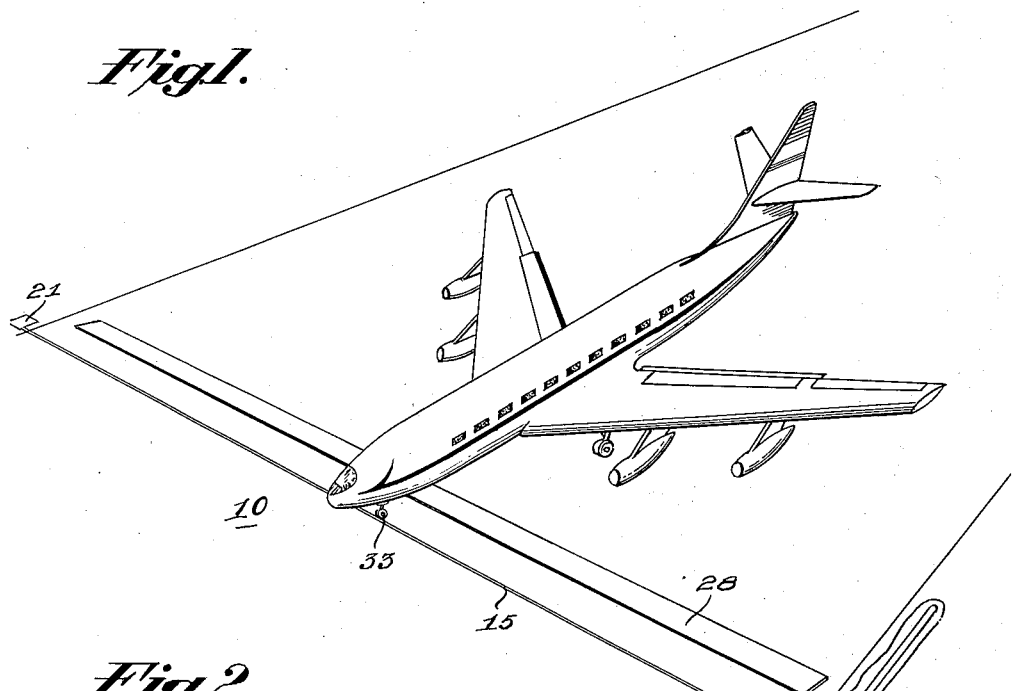
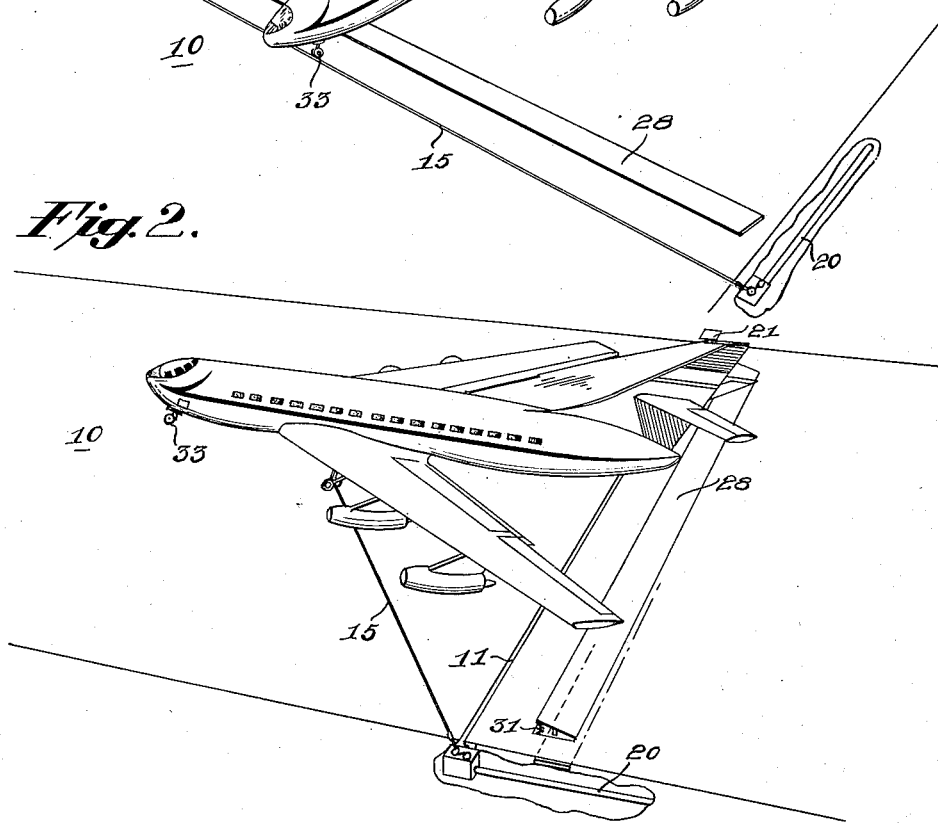

United States Patent Office 2,846,166
Patented Aug. 5, 1958

2,846,166

POP-UP MEANS FOR AN AIRCRAFT ARRESTING CABLE

Charles J. Daniels and Edward H. Haber, Wilmington, Del., assignors to All American Engineering Company, Wilmington, Del., a corporation of Delaware Application April 25, 1956, Serial No. 580,518

6 Claims. (Cl. 244—110)

The present invention relates to arresting cables and more particularly to means to pop up a flush deck arresting cable into the landing gear of an aircraft experiencing a runway overrun.

Heretofore, various arrest cable pop up arrangements have been devised. For example, explosive type pop up, spring pop up and other mechanical means have been used with some success. All of these mechanical pop up arrangements include plural mechanisms requiring considerable servicing and repair to keep the same in good operating condition.

It is an object of this invention to reduce service costs by providing fewer mechanical parts and by providing an electrical arrest cable actuator of few mechanical parts.

Another object is to provide an electrically operated arresting cable pop up system controlled by an object travelling toward the normally retracted arresting cable.

A further object is to provide novel means for maintaining an arresting cable raised above a runway surface without the use of mechanical supporting elements.

Still a further object of the present invention is to provide an electro-magnetic cable control system, whereby the cable may be held retracted below a surface and ejected above a surface and held in such raised ejected position if desired.

With these and other objects in view, the invention consists in the construction, arrangement and combination of parts hereinafter described and particularly pointed out in the claims, it being understood that it is not intended to limit the same to the details of construction.

In the drawings like parts throughout the several views are given like numerals and are thus identified in the following detailed description, wherein:

Figure 1 is a top plan view of an aircraft landing on a surface in the act of operating the arrest cable pop up mechanism;

Figure 2 is a similar plan view of an aircraft after engagement with the arrest cable;

Figure 3 is a semi-perspective illustration of the electromagnet across a landing surface with the arresting cable operatively associated therewith and a high amperage source of direct current connected through a treadle plate switch to the current conducting arrest cable; and Figure 4 is a section taken on the section line 4—4 of Figure 3, including a diagrammatic representation of the magnet energizing source.

Figure 5 is a circuit diagram of the switching mechanism for energizing the cable.

Figure 6 is a circuit diagram illustrating a switching circuit for an electromagnet having separate and distinct core sections.

Referring to the drawings and first with particular reference to Figures 1 and 2, there is illustrated a landing surface 10, which may be any surface suitable for a mobile object to travel over. Across this surface 10 at a predetermined location is a recess 11. This recess 11 is an elongated pit in which is supported and properly insulated from the ground a magnet core 12, preferably U-shaped or of the horseshoe magnet type with at least one control winding 13 coiled thereabout to supply current to the core from a suitable source of electric energy 14. The electromagnet in the recess 11 may be constantly energized and may be made with sectional cores each with an energizing winding 13A, 13B such as shown in Fig. 6 and any suitable selective switch control means for selected control of groups of such sections, if desired such as the switches 34a and 34b. Thus, for example, selected groups of such core sections may be energized so that selected portions of the cable will be popped up into the main landing gear of an aircraft in priority to the central portion of the cable, which is being traversed by the nose wheel of the landing gear. Note the switch means A and B in Fig. 6.

Co-actively and operatively associated with the electromagnet hereinafter designated A is positioned an arresting cable or landing surface pendant 15 of conductive material. The arresting cable 15 extends across the surface 10 and is coupled at each end by insulated couplings 16 and 17 to purchase cables 18 and 19, respectively. These purchase cables each lead to a respective energy absorber 20 and 21 on opposite sides of the landing surface, see Figures 1 and 2. A complete disclosure of the energy absorber is illustrated in Patent No. 2,731,219, issued January 17, 1956. The arresting cable 15 is connected to one side of a suitable source of electrical energy through line 24 and insulated coupling 16. The cable is connected to the other side of the electrical energy source through insulated coupling 17, line 25, switch contacts 29 and 30 and line 23. This latter connection is only made when switch contacts 29 and 30 are in immediate juxtaposition.

The switch 27 comprises an elongated tread plate 28 having a contact 29 thereon which is normally held above a lower fixed contact 30 by means of spring members generally indicated at 31. When the plate 28 is depressed by the weight of an object thereon the contacts 29 and 30 engage and complete an electrical circuit through the arrest cable 15, which cable is normally retracted either flush or below the landing surface 10 between the legs or poles of the core 12 of electro-magnet A. When the cable 15 is energized by closure of the switch 27 the reaction between the electrical forces in the respective circuits causes the cable 15 to pop up or eject from the field of the electro-magnet to a position above the landing surface 10. A switch 34 may be used to control the current to winding 13. This switch may be opened and closed manually.

Briefly, the operation of the present invention is as follows:

An aircraft landing on the surface 10 engages the trigger or treadle plate 28 by the nose wheel 33 rolling thereover. This causes the contacts 29 and 30 to close and actuate the high current source, which surges a large current through the arrest cable or pendant 15. This cable is normally positioned between the poles of the electromagnet A, which is excited from a separate source of current through the control winding 13. Accordingly, when the current flows through the cable 15 the interaction of the magnetic fields of the respective elements ejects the cable from between the pole pieces of the electro-magnet A. The cable 15 rises rapidly and engages the landing gear of the aircraft, see Figure 2.

In another arrangement the magnet structure may be made in segments of, for example, approximately three feet in length, so that portions of the cable 15 may be popped up only in front of the aircraft wheels without disturbing the other portions of the cable. Also, the cable 15 may be positioned a few feet above the landing surface 10 by utilizing a steady current to the cable. This would provide a resulting constant magnetic repulsion force and would thereby hold the cable at a predetermined height above the landing surface, see Figure 4.

Thus there is provided a novel device to pop up an arresting cable into the landing gear of an aircraft, whereby the usual mechanical means for such purpose are eliminated.

Without further description it is believed that the present invention is clearly understandable to others authorized to practice the same. While only one arrangement of the invention is described and illustrated in detail, it is to be expressly understood that other combinations, modifications and arrangements of the parts which will now probably occur to others skilled in the art are to be considered a part hereof. To determine the scope of the present invention, reference should be had to the appended claims.

What is claimed is:

1. An arrest cable for aircraft adapted to be electrically energized by a source of current including cable supporting means mounted in a landing surface for supporting said cable in a flush surface position, said cable supporting means providing a magnetic field immediately adjacent to said cable to pop up said cable to an elevated position from said flush surface position when the cable is energized by the interaction between the electrical energy in said cable and said magnetic field, a second source of current mounted in the landing surface in advance of the said cable supporting means and connected between said second source of current and said cable to independently energize said arrest cable by said second source of current, whereby the said cable will pop up into the main landing gear of the aircraft back of the nose wheel, and energy absorber means connected to said arrest cable.

2. In combination, an arrest cable of conductive material connected to a first electric power source and electromagnetic means supported in a landing surface, a control winding for said electro-magnet connected to a second electric power source, an aircraft nose wheel actuated switch mounted in the landing surface in advance of the said electro-magnet and connected between said first electric power source and said arrest cable to complete a circuit between said first electric power source and said arrest cable to energize said arrest cable, whereby the said cable will pop up into the main landing gear of the aircraft back of the nose wheel by interaction between the magnetic field of said electro-magnetic means and the electrical energy in said arrest cable, and energy absorber means connected to said arrest cable.

3. In combination, an electrically conductive arrest cable for connection with suitable arresting means including magnetic means supported in a landing surface in a predetermined position with respect to said cable when said cable is in a flush surface position and control means for electrically energizing said cable in cooperative relationship with said magnetic means causing said cable to pop up to an elevated position from said flush surface position when the cable is energized.

4. The combination as described in claim 3 wherein the said magnetic means is an electro-magnetic means.

5. The combination as described in claim 3 wherein the said magnetic means includes a plurality of individual core sections.

6. Means for arresting a mobile object comprising an electrically conductive arrest cable, magnetic means mounted in the surface on which said mobile object is travelling for supporting said arrest cable in a flush surface position, control means for electrically energizing said cable from an electric power source in cooperative relationship with said magnetic means causing said cable to pop up to an elevated position from said flush surface position when the cable is energized, said control means comprising a weight actuated switch mounted in said surface in advance of the said cable and connected between said electric power source and said arrest cable to energize said arrest cable, whereby the said cable while energized will be maintained elevated above said surface.

References Cited in the file of this patent
UNITED STATES PATENTS

| 2,693,788 | Spatz | Nov. 9, 1954 |
| 2,712,912 | Hattan | July 12, 1955 |